United States Patent [19]
Takahashi et al.

[11] Patent Number: 5,104,180
[45] Date of Patent: Apr. 14, 1992

[54] FOLDING AND LOCK MECHANISM FOR BABY CHAIR

[75] Inventors: Takehiko Takahashi; Tomihisa Kaneko, both of Tokyo, Japan

[73] Assignee: Combi Co., Ltd., Tokyo, Japan

[21] Appl. No.: 409,831

[22] Filed: Sep. 20, 1989

[30] Foreign Application Priority Data

Mar. 8, 1989 [JP] Japan .................... 1-25585[U]

[51] Int. Cl.⁵ .................................................. A47C 4/00
[52] U.S. Cl. ...................................... 297/16; 280/642
[58] Field of Search .................. 297/16, 46, 47, 27, 297/28; 280/642, 644

[56] References Cited

U.S. PATENT DOCUMENTS

| | | | |
|---|---|---|---|
| 4,412,688 | 11/1983 | Giordani | 280/642 |
| 4,632,421 | 12/1986 | Shamie | 280/642 |
| 4,697,823 | 5/1987 | Kassai | 280/644 |
| 4,706,986 | 11/1987 | Kassai | 280/642 |
| 4,723,815 | 2/1988 | Kassai | 280/642 X |
| 4,741,551 | 5/1988 | Perego | 280/642 |
| 4,828,278 | 5/1989 | Nakao et al. | 280/644 |
| 4,832,361 | 5/1989 | Nakao et al. | 280/642 |

FOREIGN PATENT DOCUMENTS

| | | | |
|---|---|---|---|
| 2394435 | 12/1979 | France | 280/644 |
| 742778 | 1/1956 | United Kingdom | |
| 1275052 | 5/1972 | United Kingdom | |

Primary Examiner—Jose V. Chen
Attorney, Agent, or Firm—Sughrue, Mion, Zinn, Macpeak & Seas

[57] ABSTRACT

A folding and locking mechanism for a folding baby chair, the mechanism locks the chair in an assembled and folded condition and is unlocked from either condition by the same simple manual operation. A bracket pivotally connected between a rear leg and a support arm locks in two respective positions on a retainer pin which rides on the bracket periphery and is received by a pair of retainer recesses, one for the assembled condition and one for the folded condition. The retainer pin is held by a locking lever that pivots and moves up and down in a holder frame within the support arm. Movement of the lever upward by a simple manual action urges the retainer pin away from the bracket, allowing the bracket to rotate to thereby fold or assemble the chair. A descending operating plate holds the upwardly urged locking lever in the up position until the bracket begins to rotate.

8 Claims, 5 Drawing Sheets

FOLDING AND LOCK MECHANISM FOR BABY CHAIR

BACKGROUND OF THE INVENTION

This invention relates to a lock mechanism for a baby chair which can be folded for storage, and more particularly, to such a lock mechanism which is operable to accurately maintain and lock the relevant mechanism in a folded condition or an assembled condition.

It is well known that with the modernization of the mode of living, the living space utilizing straw matting (tatami) has been increasingly replaced by the living space utilizing a rigid floor. Particularly, this tendency is marked with respect to mansions and like buildings.

As a result of the above change in living mode, tables and chairs are naturally used, and accordingly the living mode of a baby is changed. For example, a baby chair used in a room is required to have such a height (i.e., the height of the seat) that it can be suitably used with a dining table and other living instruments that adults use.

A typical baby chair is bulky, and therefore it is desirably that when the baby chair is not in use or when the baby grows up, the chair can be folded up by suitable means in a compact manner for storage.

However, a conventional baby chair is designed to be suited for the mode of living using straw matting (tatami), and therefore has a low seat. For this reason, such a conventional baby chair cannot be suitably used for the new mode of living using tables and chairs. Another problem is that such a conventional baby chair is of a fixed construction and cannot be folded up for storage or other purposes, and therefore occupies a large space. Thus, the conventional baby chair is not suited for the above new mode of living.

Also, the conventional folding mechanism has a locking mechanism for maintaining the assembled condition and folded condition. It is preferable to readily release the locking mechanism. However, in some cases, due to the mounted position of the locking mechanism, it is difficult to perform the release operation.

SUMMARY OF THE INVENTION

The present invention seeks to overcome the above problems.

More specifically, an object of the invention is to provide a folding and lock mechanism for a baby chair in which the locking mechanism can be released through the manipulation of a single operating mechanism whether the chair is locked in a folded or assembled condition.

Another object is to provide a mechanism for temporarily holding a lock release in the lock releasing operation, so that the baby chair may be again held in a position where it is easy to fold the chair.

According to the present invention, there is provided a folding and lock mechanism for a baby chair of the conventional type CHARACTERIZED in that:

a bracket is pivotally connected at its proximal end to each rear leg intermediate opposite ends of the rear leg in such a manner that the bracket can be pivotally movable in an inverted manner along the direction of the length of the rear leg, the upper end of the rear leg being pivotally connected to a front portion of an armrest, and the bracket having a retainer recess for maintaining an upstanding condition and another retainer recess for maintaining a folded condition;

an upper end of the bracket is pivotally connected to a lower end portion of a support member in such a manner that the bracket can be pivotally moved in an inverted manner, the support member pivotally supporting a proximal end of the armrest;

the two retainer recesses formed in the bracket are capable of being selectively releaseably engaged in and retained by a distal end of a retainer pin formed at the lower end of the lock lever mounted inside the support member for upward and downward movement.

DETAILED DESCRIPTION OF A PREFERRED EMBODIMENT

Figure 1:
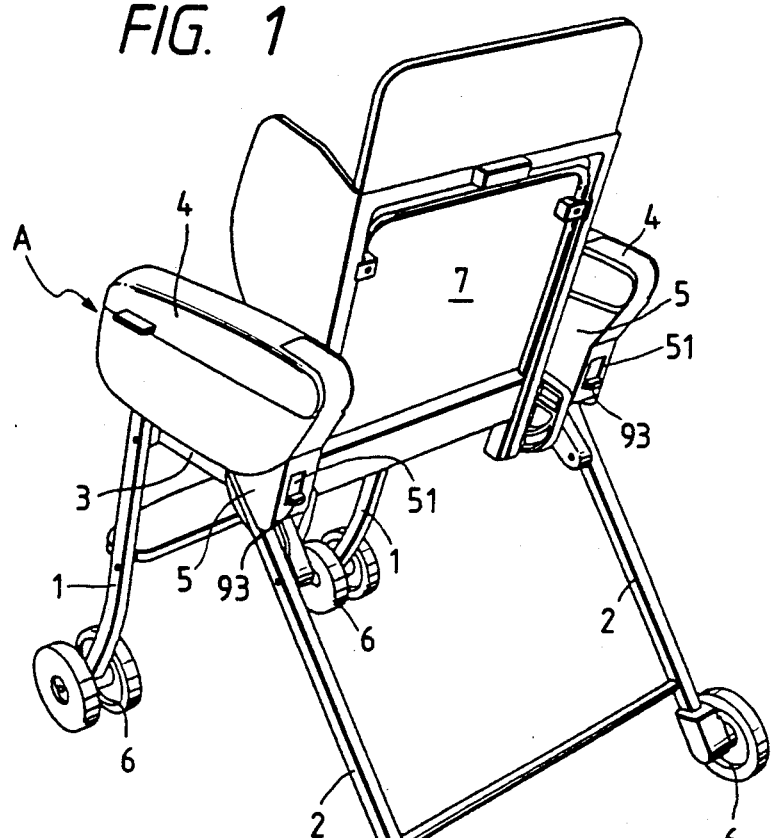
FIG. 1 is a perspective view of a baby chair as viewed from the rear.

A preferred embodiment of the invention will now be described with reference to the drawings.

A baby chair generally designated at A is of the known type. Front legs 1 and 1 and rear legs 2 and 2 are so arranged that they diverge downwardly when viewed form the side of the chair. The upper ends of the front legs 1 as well as the upper ends of the rear legs 2 are received in and pivotally connected to armrests 4 of an inverted U-shaped cross-section near the front ends of the armrests 4; the armrests 4 being arranged respectively on opposite sides of a seat 3 in an upstanding manner.

A support member 5 pivotally supports the rear end of the armrest 4 through a pivot pin. The rear end of the support member 5 abuts against the upper surface of the rear leg 2 intermediate the opposite ends of the rear leg 2. Thus, the support member 5 is supported from below.

The front legs 1 and the rear legs 2 are so designed that upon folding of the chair, they are folded in such a manner that their lower ends are moved toward each other.

Wheels 6 are optionally mounted on the lower ends of the front and rear legs 1 and 2, respectively. If the chair need be moved, these wheels are utilized.

A backrest 7 extends upwardly at the rear of the seat 3. In synchronism with the folding of the front and rear legs 1 and 2, the seat 3 and the backrest 7 are folded into a generally V-shape in such a manner that the upper surface of the seat 3 and the inner surface of the backrest 7 are moved toward each other.

Reference numeral 8 denotes a bracket for effecting the folding operation. A proximal end of a smaller diameter is pivoted as at 81 to the rear leg 2 intermediate the opposite ends of the rear leg 2, and the other end of a greater diameter which has a disc-like shape is pivoted as at 82 at it central portion to the lower end portion of the support member 5 to which the proximal end of the armrest 4 is pivotally connected.

The bracket 8 can be angularly moved in an inverted manner about the pivot portion 81 upwardly and downwardly in the direction of the length of the rear leg 2. In accordance with this angular movement, the support member 5, pivoted at its lower end as at 82, is moved downwardly in the direction of the length of the rear leg 2.

Formed in the peripheral edge of the disc-like greater-diameter end of the bracket 8 is a retainer recess 83 for assembling purposes. When the baby chair is in its assembled condition, that is, in use, a retainer pin 91 formed on a lower end of a lock lever 9 is releaseably engaged in the retainer recess 83, the lock lever 9 being mounted inside the support member 5.

Also formed in the peripheral edge of the disc-like greater-diameter end of the bracket is another retainer recess 84 for folding purposes. When the baby chair is in its folded condition, that is, in its stored condition, the retainer pin 91, mounted on the lower end of the lock lever 9 mounted inside the support member 5, is releaseably engaged in the retainer recess 84.

The retainer recess 84 for folding purposes is formed in the peripheral edge in opposite relation to the retainer recess 83 for assembling purposes with respect to the pivot portion 82.

The disc-like greater-diameter end is not accurately in the form of a disc, and a portion on the peripheral edge disposed immediately forward of the retainer recess 83 is farthest from the pivot portion 82 than the other portions on the peripheral edge. Thus, the distance between the peripheral eccentric arcuate edge and the pivot portion 82 is gradually varied, thereby ensuring that the engagement of a pivot pin 13 of the lock lever 9 with a retainer stepped portion 17 formed in an upper end of a descending operating plate 15 can be released.

The lock lever 9 is mounted inside a holder frame 10 so as to be slidable upwardly and downwardly, the holder frame 10 being fixedly mounted inside the support member 5. The lock lever 9 is normally urged downwardly (i.e., in a descending direction) by a tension spring 11 extending between the lower end of the holder frame 10 and the upper end of the lock lever 9.

A pivot pin 12 extends through manipulation-guide slots 92 formed through the lower end portion of the lock lever 9. The pivot pin 13 extends through the upper end portion of the lock lever 9, and the opposite ends of the pivot pin 13 are received in slide-guide slots 14 formed through the upper end portion of the holder frame 10. The two pivot pins 12 and 13 ensure that the lock lever 9 can be slidable upwardly and downwardly.

The pivot pin 12 extending through the lower end portion of the lock lever 9 extends through the front of the lower end portion of the holder frame 10. The opposite ends of the pivot pin 12 are mounted on the holder frame 10.

The opposite ends of the pivot pin 13 mounted on the upper end portion of the lock lever 9 project outwardly from the opposite sides of the lock lever 9, respectively, and these projecting opposite ends of the pivot pin 13 are slidably received in the slide-guide slots 14 formed through the holder frame 10.

The pivot pin 13 mounted on the upper end portion of the lock lever 9 also serves to retain the descending operating plate 15 for the lock lever 9.

The retainer pin 91 extends perpendicularly from the side of the lock lever 9 at its lower portion, and the retainer pin 91 is selectively received in the retainer recesses 83 and 84 formed in the peripheral edge of the bracket 8.

The lock lever 9 has a manipulation thumbpiece 93 formed on its rear face at a suitable height, the thumbpiece 93 extending rearwardly through a hole 51 formed through the support member 5.

The descending operating plate 15 for the lock lever 9 is pivotally mounted on the pivot pin 12 intermediate the opposite ends of the plate 15.

A spring 16 extends between the descending operating plate 15 and the holder frame 10, and the upper end portion of the descending operating plate 15 is normally inclined toward the pivot pin 13 under a contracting force of the spring 16. The retainer stepped portion 17 is formed at the upper end of the descending operating plate 15. When the lock lever 9 is raised by manipulating the manipulation thumbpiece 93, the retainer stepped portion 17 is engaged with the underside of the pivot pin 13 extending through the upper end portion of the lock lever 9, so that the retainer stepped portion 17 supports the pivot pin 13 to prevent the lock lever 9 from descending.

The descending operating plate 15 is of such a length that its lower end can engage the peripheral edge of the bracket 8 and particularly that portion of this peripheral edge disposed immediately forward of the assembling-purpose retainer recess 83. When the bracket 8 is pivotally moved in an inverted manner, the lower end of the descending operating plate 15 engages the aforesaid portion of the bracket 8 and is urged by it, so that the engagement of the retainer stepped portion 17 with the pivot pin 13 is released.

The lock lever 9 and the descending operating plate 15 are mounted inside the holder frame 10 in juxtaposed relation to each other, and are pivotally mounted on the common pivot pin 12.

The above construction operates in the following manner:

(1) When the baby chair in its assembled condition is to be folded, this is done as follows:
  I. In the assembled condition of the baby chair, the parts of the chair are in the condition shown in FIGS. 5(a) and 5(b). More specifically, they are in the following condition:
    (a) The lock lever 9 is held in its lowest position inside the holder frame 10.
    (b) The bracket 8 is held in engagement with the lock lever 9 in such a manner that its disc-like greater-diameter end is disposed at the upper portion of the rear leg 2.

(c) The retainer pin 91 projecting from the side of the lower end of the lock lever 9 is received and retained in the assembling-purpose retainer recess 83 formed in the peripheral edge of the disc-like end of the bracket 8. As a result, the bracket 8 is prevented from pivotal movement.

(d) Although the descending operating plate 15 is inclined under the influence of the spring 16 in such a manner that its upper end having the retainer stepped portion 17 is urged toward the pivot pin 13, the pivot pin 13 is not engaged in the retainer stepped portion 17 since the pivot pin 13 is disposed below the retainer stepped portion 17.

Figure 5A:
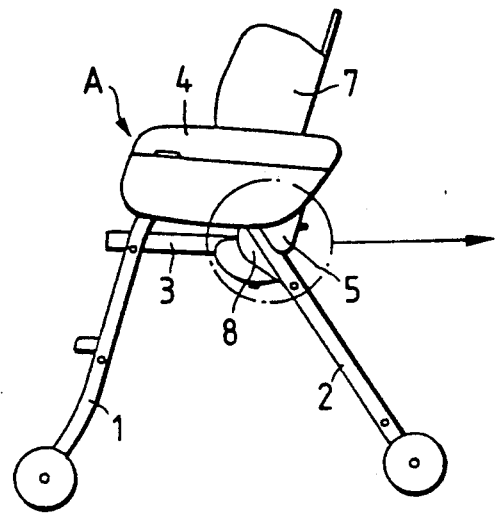
FIG. 5(a) is a side-elevational view of the baby chair in its assembled condition.
Figure 5B:
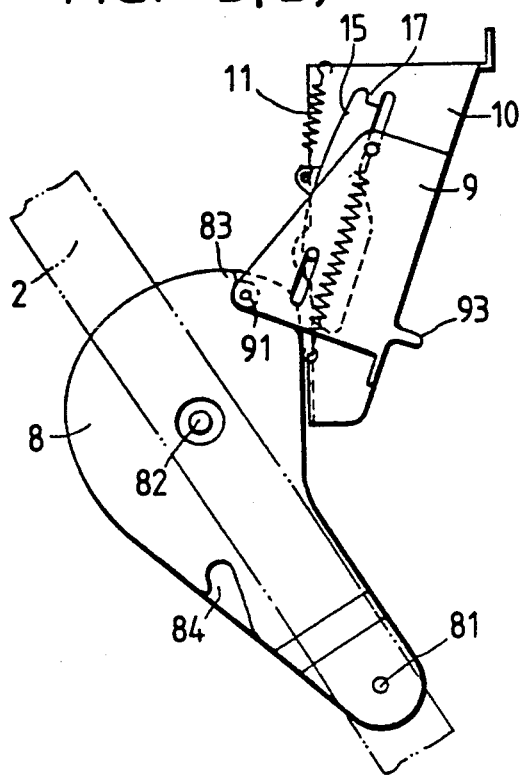
FIG. 5(b) is a fragmentary side-elevational view showing the lock mechanism when the chair is in the condition of FIG. 5(a)

(e) As a result, the baby chair is maintained in the assembled condition as shown in FIGS. 1, 5(a), and the armrest 4 is maintained horizontally, and the support member 5 is maintained in an upstanding condition.

II. In the above condition, when the baby chair is to be folded, the following operation is carried out:

(a) First, the manipulation thumbpiece 93 projecting rearwardly from the rear face of the support member 5 is held and is moved upwardly.

(b) As a result of the above manipulation, the lock lever 9 integral with the manipulation thumbpiece 93 is slidingly moved upwardly inside the holder frame 10, so that the retainer pin 91, projecting from the side of the lower end of the lock lever 9, is disengaged from the assembling-purpose retainer recess 83.

(c) Upon disengagement of the retainer pin 91 from the retainer recess 83, the bracket 8 and the lock lever 9 are disconnected from each other and therefore are independent of each other. The bracket 8 which is no longer prevented from rotating can now be pivotally moved downwardly along the rear leg 2.

(d) When the lock lever 9 is slidingly moved upwardly inside the holder frame 10 (i.e., the above operation (a)), the pivot pin 13 extending through the upper end portion of the lock lever 9 is brought into engagement with the retainer stepped portion 17 formed at the upper end of the descending operating plate 15. As a result, the lock lever 9 is prevented from downward sliding movement (descending movement).

Figure 6A:
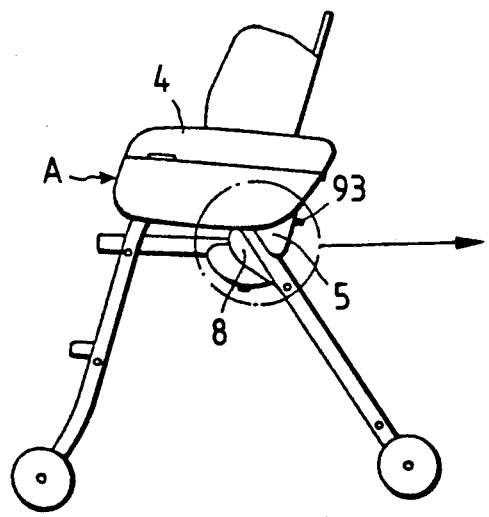
FIG. 6(a) is a side-elevational view of the baby chair showing an initial stage of the folding operation.
Figure 6B:
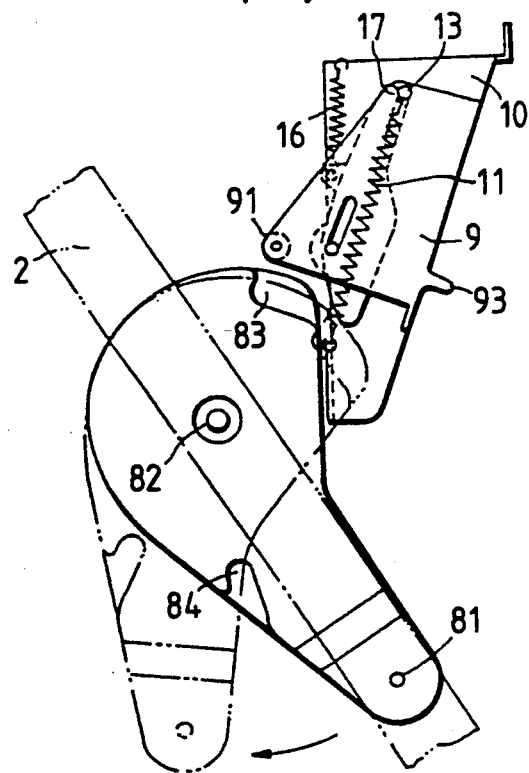
FIG. 6(b) is a fragmentary side-elevational view showing the lock mechanism when the chair is in the condition of FIG. 6(a)

(e) The preparations for initiating the folding of the baby chair are made when the above operations (a) to (d) are completed, and at the same time the parts are in the condition shown in FIG. 6(b).

Figure 7A:
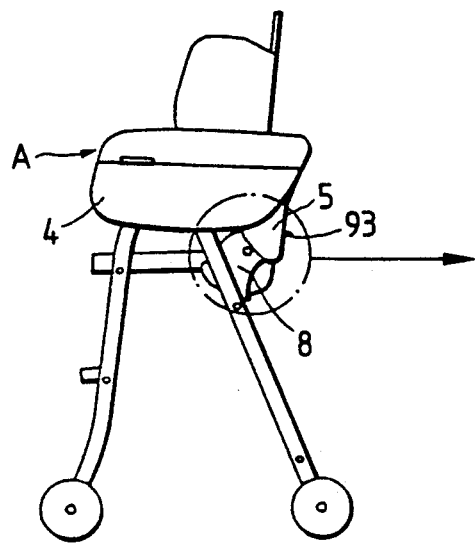
FIG. 7(a) is a side-elevational view of the baby chair in which the folding operation proceeds slightly from that of FIG. 6(a)
Figure 7B:
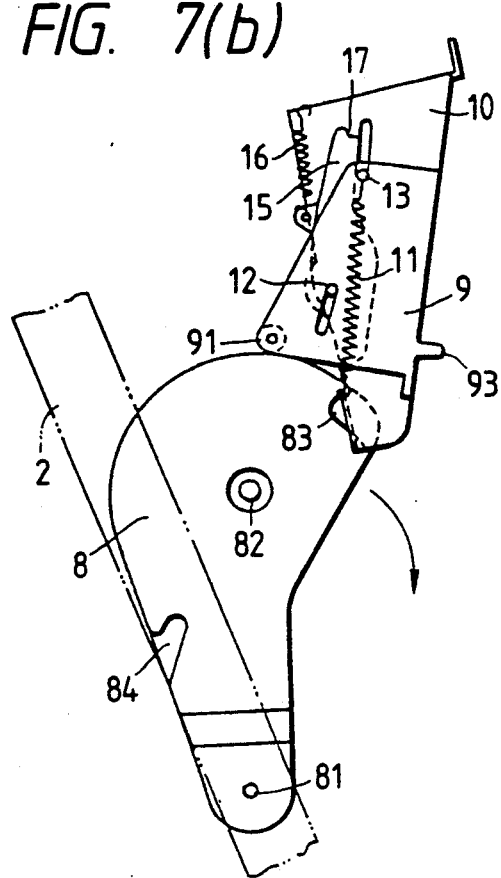
FIG. 7(b) is a fragmentary side-elevational view showing the lock mechanism when the chair is in the condition of FIG. 7(a)

III. Initiation of Folding Operation (a) After the above operations are completed, the bracket 8 is rotated in a direction of an arrow indicated in FIG. 7(b). In this case, by holding the backrest 7 and lifting up the chair by one hand, and holding the front edge of the seat portion 3 and folding it inwardly by the other hand, the bracket 8 is smoothly rotated in the direction indicated by the arrow in FIG. 7(b).

(b) That portion of the peripheral edge of the bracket 8 which is disposed immediately forward of the retainer recess 83 has a greater outer diameter than the other portions. Therefore, during the time when the bracket 8 rotates (that is, generates a rotation locus), the above-mentioned greater-diameter portion is brought into engagement with the lower end of the descending operating plate 15 and urges the same in the direction of the rotation. This occurs when the condition shifts from that shown in FIG. 6(b) to that shown in FIG. 7(b).

(c) When the descending operating plate 15 is urged to be pivotally moved in the direction of the rotation (the above operation (b), the upper end of the descending operating plate 15 disposed in opposite relation to its lower end with respect to the pivot pin 13 is pivotally moved out of engagement with the pivot pin 13. As a result, the lock lever 9 which has been prevented from descending through the engagement of the pivot pin 13 with the descending operating plate 15 can descend freely.

(d) During the rotation of the bracket 8, the retainer pin 91 is kept in contact with the peripheral edge of the bracket 8. As the rotation of the bracket 8 proceeds, the folding-purpose retainer recess 84 reaches the retainer pin 91 whereupon the recess 84 receives the retainer pin 91. Thus, the two are accurately engaged with each other, and the folding condition is maintained (see FIGS. 8(a) and 8(b)).

(2) When the baby chair in its folded condition is to be assembled, the following operation is carried out:

In this case, operation in contrast with the above operations are carried out.

Although the explanation of these operations overlaps that of the above-mentioned operations, these will be described in detail in the following:

I. In the assembled condition, the retainer mechanisms are in the condition shown in FIG. 8(b). More specifically, they are in the following condition:

(a) The lock lever 9 is held in its lowest position inside the holder frame 10.

(b) The bracket 8 is held in engagement with the lock lever 9 in such a manner that its disc-shaped greater-diameter end is disposed at the lower portion of the rear leg 2.

(c) The retainer pin 91 projecting from the side of the lower end of the lock lever 9 is received and retained in the folding-purpose retainer recess 84 formed in the peripheral edge of the disc-like end of the bracket 8. As a result, the bracket 8 is prevented from being pivotally moved upwardly.

(d) Although the descending operating plate 15 is inclined under the influence of the spring 16 in such a manner that its upper end having the retainer stepped portion 17 is urged toward the pivot pin 13, the pivot pin 13 is not engaged in the retainer stepped portion 17 since the pivot pin 13 is disposed below the retainer stepped portion 17.

Figure 2:
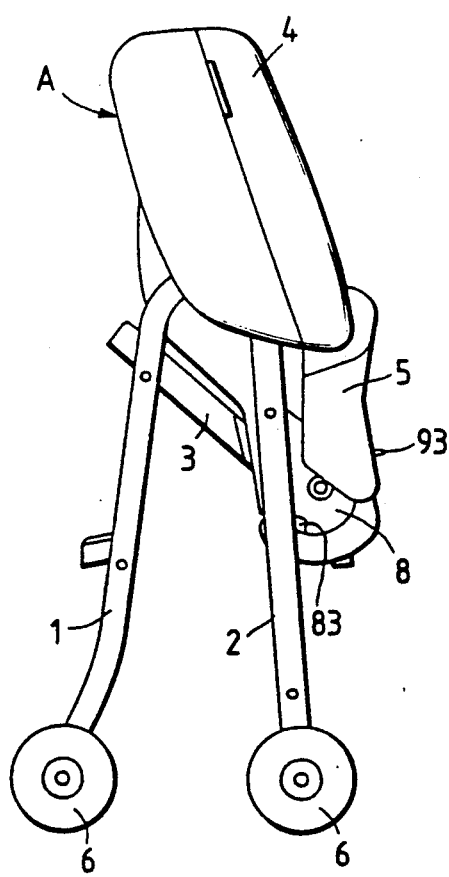
FIG. 2 is a perspective view showing a baby chair in the folded condition.
Figure 3:
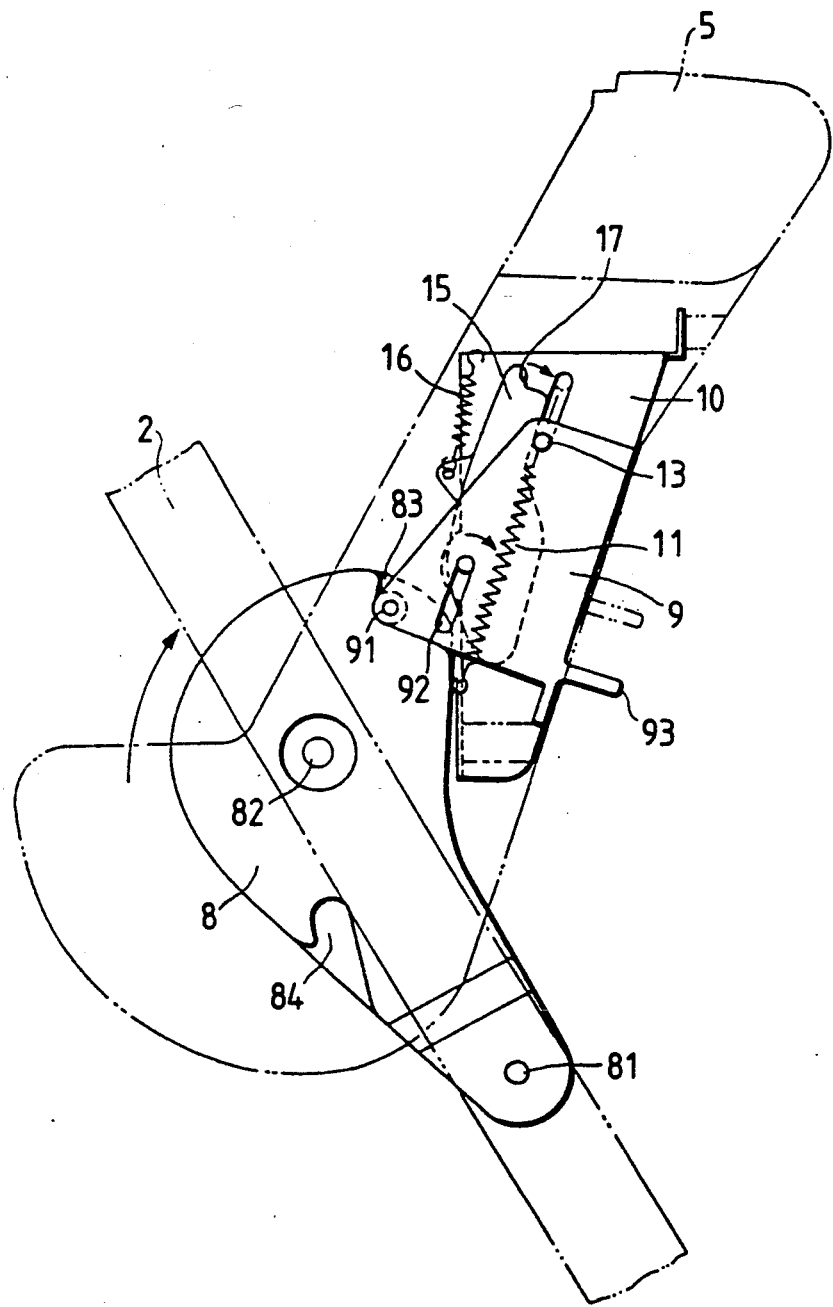
FIG. 3 is a fragmentary, enlarged side-elevational view showing a lock mechanism in an assembled condition.
Figure 4:
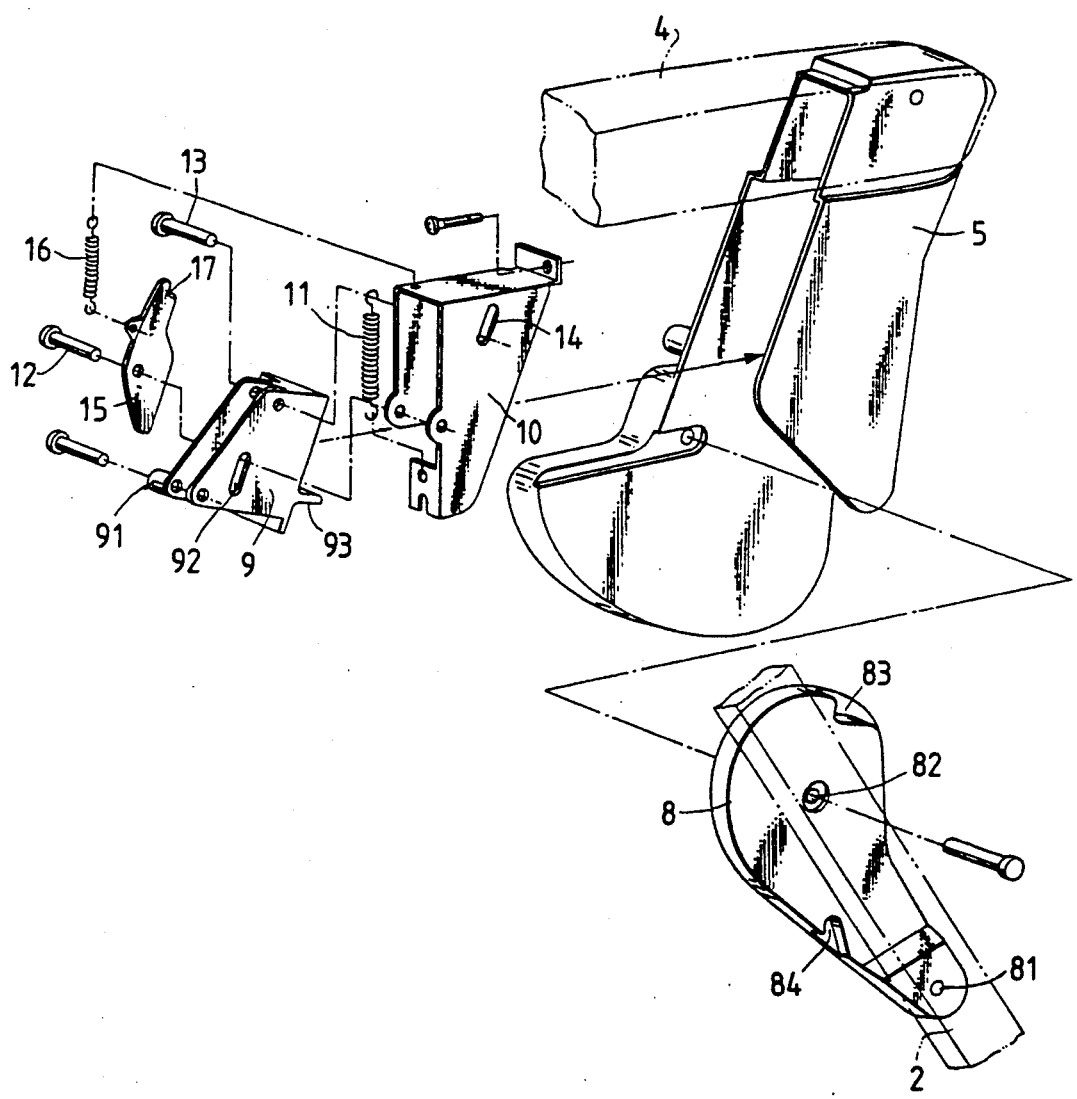
FIG. 4 is an exploded perspective view of a portion of the lock mechanism.
Figure 8A:
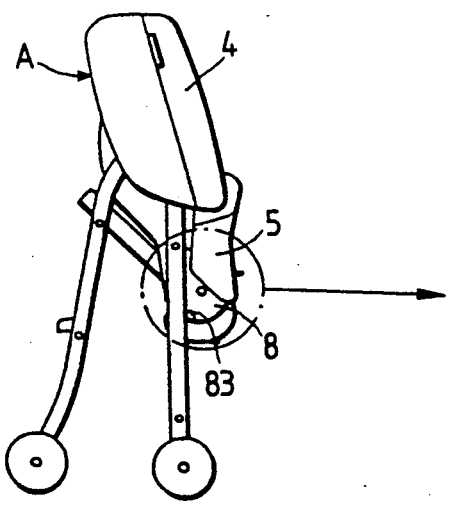
FIG. 8(a) is a side-elevational view of the completely folded baby chair.
Figure 8B:
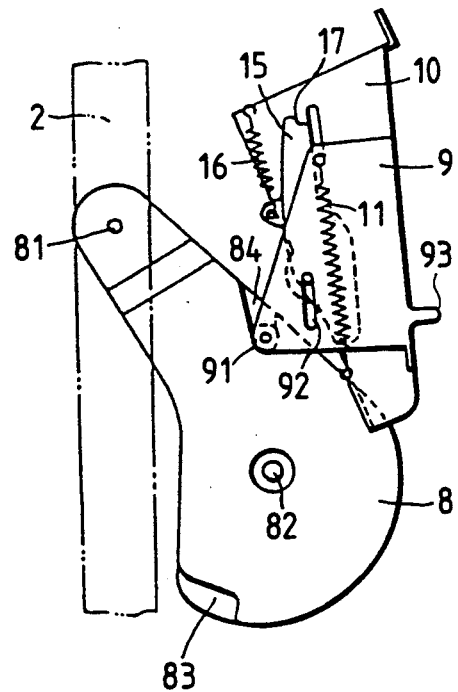
FIG. 8(b) is a fragmentary side-elevational view showing the lock mechanism when the chair is in the condition of FIG. 8(a).

(e) As a result, the baby chair is maintained in the folded condition as shown in FIGS. 2 and 8(a).

II. In the above condition, when the baby chair is to be assembled, the following operation is carried out:

(a) First, the manipulation thumbpiece 93 projecting rearwardly from the rear face of the support member 5 is held and is moved upwardly.

(b) As a result of the above manipulation, the lock lever 9 integral with the manipulation thumbpiece 93 is slidingly moved upwardly inside the holder frame 10, so that the retainer pin 91, projecting from the side of the lower end of the lock lever 9, is disengaged from the folding-purpose retainer recess 84.

(c) Upon disengagement of the retainer pin 91 from the retainer recess 84, the bracket 8 and the lock lever 9 are disconnected from each other and therefore are independent of each other.

The bracket 8 which is no longer prevented by any part from rotation can now be pivotally moved upwardly along the rear leg 2.

(d) When the lock lever 9 is slidingly moved upwardly inside the holder frame 10 (i.e., the above operation (a)), the pivot pin 13 extending through the upper end portion of the lock lever 9 is brought into engagement with the retainer stepped portion 17 formed at the upper end of a descending operating plate 15. As a result, the lock lever 9 is prevented from downward sliding movement (descending movement). (With respect to the relation between the lock lever 9 and the descending operating plate 15, see FIG. 6(b)).

III Initiation of Assembling Operation (a) After the above operations are completed, the bracket 8 which is not prevented from rotation is rotated upwardly toward the upper portion of the rear leg 2. In this case, by holding the backrest and lifting the chair A by one hand, and drawing the front edge of the seat portion 3 by the other hand, the bracket 8 is smoothly rotated.

(b) That portion of the peripheral edge of the bracket 8 which is disposed immediately forward of the retainer recess 83 has a greater outer diameter than the other portions. Therefore, during the time when the bracket 8 rotates upwardly toward the upper portion of the rear leg 2 (that is, generates a rotation locus), the above-mentioned greater-diameter portion disposed immediately forward of the retainer recess 83 is brought into engagement with the lower end of the descending operating plate 15 and urges this lower end upwardly.

(c) When the descending operating plate 15 is urged upwardly (the above operation (b)), the upper end of the descending operating plate 15 disposed in opposite relation to its lower end with respect to the pivot pin 13 is urged upwardly out of engagement with the pivot pin 13. As a result, the lock lever 9 which has been prevented from descending through the engagement of the pivot pin 13 with the descending operating plate 15 can descend freely.

(d) During the rotation of the bracket 8, the retainer pin 91 of the lock lever 9 is kept in contact with the peripheral edge of the bracket 8. As the rotation of the bracket 8 proceeds, the assembling-purpose retainer recess 83 reaches the retainer pin 91 whereupon the recess 83 receives the retainer pin 91. Thus, the two are accurately engaged with each other, and the assembling condition is maintained (see FIG. 5(a)).

(e) Thereafter, by repeating the above-mentioned operations, the folding and assembling of the baby chair can be effected.

(1) The baby chair can be quite easily folded and assembled merely by moving the lock lever 9 upwardly.

(2) The mechanism for maintaining the bracket 8 in the folded and assembled conditions is provided merely by a combination of the lock lever 9, mounted inside the holder frame 10, and the descending operating plate 15 for limiting the downward movement of the lock lever 9. Therefore, such a mechanism can be easily manufactured, and will hardly be subject to a malfunction.

(3) The mechanism for maintaining the folded and assembled conditions is provided merely by a combination of the bracket 8 and the retainer mechanism engageable therewith. In addition, these mechanisms are incorporated in one portion, and therefore the overall construction can be quite compact, which enhances the design freedom of the body of the baby chair.

(4) The lock release of the lock lever 9 may be temporarily held by the descending operation plate 15. As a result, since the user may regrip the backrest 7 by one hand and the seat portion 3 by the other hand, it is easy for her/him to fold and assemble the chair.

What is claimed is:

1. A folding and lock mechanism for a foldable baby highchair having a height suitable for use with a dining table and having front and rear legs and armrests, each of said armrests having a front end and a rear end, said rear legs being pivotally connected to said front end of said armrests, respectively, said folding and lock mechanism comprising:

support members pivotally connected to and supporting said armrests at said rear ends, respectively;

a bracket pivotally connected near one end thereof to one rear leg at a first pivot point and pivotally connected near another end thereof to a corresponding one of said support members at a second pivot point; said bracket being pivotally movable in an inverted manner along the direction of the length of said rear leg by virtue of a downward pivotal movement of said one support member when said baby highchair is moved to a folded condition; said bracket having a retainer recess for maintaining said baby highchair in an assembled condition and having a second retainer recess for maintaining said baby highchair in said folded condition;

a holder frame mounted within said one support member and having slide-guide slots therein;

a lock lever mounted within said holder frame by means of a pivot pin received in said slide-guide slots so as to be slidingly movable upwardly and downwardly relative to said holder frame, said lock lever having a retainer pin at its lower end thereof;

spring means extending between said holder frame and said lock lever and for urging said lock lever downwardly to cause said retainer pin to engage said bracket;

said retainer recesses being positioned on said bracket to receive said retainer pin and thereby lock said baby highchair in the assembled and folded condition, respectively, when said bracket is pivoted to a first position and an opposite second position, respectively, and further comprising a descending operating plate pivotally mounted at its central portion to said lock lever, said plate having a stepped portion at its upper end for engaging said pivot pin and a lower end reaching to a periphery of said bracket, and said pivot pin connecting said lock lever in up-down sliding and pivoting relation to holder frame.

2. A folding and lock mechanism for a foldable baby highchair as claimed in claim 1, wherein said lock lever is shaped to be manually movable against the force of said spring means to release said retainer pin from engagement with either said retainer recesses to unlock said baby highchair for folding or assembling.

3. A folding and lock mechanism for a foldable baby highchair as claimed in claim 2, wherein said first position of said bracket is such that said second pivot point of connection between said bracket and said support member is above said first pivot point of said bracket and said rear leg, whereby said armrest is supported and locked in position by said support member and said bracket; and wherein said opposite second position is one where said second pivot point is below said first pivot point.

4. A folding and lock mechanism for a foldable baby highchair as claimed in claim 3, wherein said retaining recesses are positioned diametrically on opposite edges of said bracket relative to said second pivot point.

5. A folding and lock mechanism for a baby highchair according to claim 1, wherein said bracket has an eccentric peripheral portion surrounding the second pivot connection to said support member, said two retainer recesses being formed in a peripheral edge of the eccentric peripheral portion of said bracket and being disposed in generally opposite relation to each other.

6. A folding and lock mechanism for a foldable baby highchair as claimed in any of claims 1-5, wherein said bracket, said holder frame and said locking lever, and their respective connections are duplicated for the other said rear leg and support member.

7. A folding and lock mechanism for a foldable baby chair of the type having front and rear legs and armrests, said rear legs being pivotally connected to a front end of said armrests, respectively, said folding and lock mechanism comprising:

support members pivotally connected to and supporting said armrests at their rear ends, respectively;

a bracket pivotally connected near one end thereof to one rear leg at a first pivot point and pivotally connected near another end thereof to a corresponding one of said support members at a second pivot point; said bracket being pivotally movable in an inverted manner along the direction of the length of said rear leg by virtue of a downward pivotal movement of said one support member when said baby chair is moved to a folded condition; said bracket having a retainer recess for maintaining said baby chair in an assembled condition and having a second retainer recess for maintaining said baby chair in said folded condition;

a holder frame mounted in said one support member and having slide-guide slots therein;

a lock lever mounted on said holder frame by means of a pivot pin received in said slide-guide slots so as to be slidingly movable upwardly and downwardly relative to said holder frame, said lock lever having a retainer pin at its lower end thereof;

spring means extending between said holder frame and said lock lever and for urging said lock lever downwardly to cause said retainer pin to engage said bracket;

said retainer recesses being positioned on said bracket to receive said retainer pin and thereby lock said chair in the assembled and folded condition, respectively, when said bracket is pivoted to a first position and an opposite second position respectively;

wherein said lock lever is shaped to be manually movable against the force of said spring means to release said retainer pin from engagement with either said retainer recesses to unlock said chair for folding or assembling; and wherein said first position of said bracket is such that said second pivot point of connection between said bracket and said support member is above said first pivot point of said bracket and said rear leg, whereby said armrest is supported and locked in position by said support member and said bracket; and wherein said opposite second position is one where said second pivot point is below said first pivot point;

further comprising:

a descending operating plate pivotally mounted at its central portion to said lock lever, said plate having a stepped portion at its upper end thereof and a lower end reaching to a periphery of said bracket, and said pivot pin connecting said lock lever in up-down sliding and pivoting relating to said holder frame; said stepped portion engaging said pivot pin to hold said lock lever in an up-unlocking position when said lock lever is manually urged upward; said bracket engaging the lower end of said descending operating plate during rotation of said bracket to release said pivot pin from said stepped portion.

8. A folding and lock mechanism for a foldable baby chair as claimed in claim 7, wherein said bracket, said holder frame, said locking lever, and said descending operating plate and their respective connections are duplicated for the other said rear leg and support member.

* * * * *